(12) United States Patent
Bader

(10) Patent No.: US 11,801,789 B2
(45) Date of Patent: Oct. 31, 2023

(54) SELF-ADAPTING VARIABLE LOUDNESS AND/OR VARIABLE SOUND PATTERN EMERGENCY VEHICLE SIREN SYSTEM WITH OPTIONAL COLLISION WARNING

(71) Applicant: Federal Signal Corporation, Oak Brook, IL (US)

(72) Inventor: Joseph F. Bader, Monee, IL (US)

(73) Assignee: FEDERAL SIGNAL CORPORATION, Oak Brook, IL (US)

( * ) Notice: Subject to any disclaimer, the term of this patent is extended or adjusted under 35 U.S.C. 154(b) by 180 days.

(21) Appl. No.: 16/936,551

(22) Filed: Jul. 23, 2020

(65) Prior Publication Data

US 2021/0023987 A1    Jan. 28, 2021

Related U.S. Application Data

(60) Provisional application No. 62/879,174, filed on Jul. 26, 2019.

(51) Int. Cl.
| | |
|---|---|
| *B60Q 5/00* | (2006.01) |
| *B60Q 1/26* | (2006.01) |
| *G01S 13/86* | (2006.01) |
| *G01S 13/931* | (2020.01) |

(52) U.S. Cl.
CPC ........... *B60Q 5/006* (2013.01); *B60Q 1/2611* (2013.01); *G01S 13/867* (2013.01); *G01S 13/931* (2013.01); *G01S 2013/932* (2020.01)

(58) Field of Classification Search
None
See application file for complete search history.

(56) References Cited

U.S. PATENT DOCUMENTS

| | | | | |
|---|---|---|---|---|
| 5,546,538 | A * | 8/1996 | Cobbley | G06F 3/16 |
| | | | | 704/E15.04 |
| 5,568,137 | A * | 10/1996 | Liu | G05D 1/0234 |
| | | | | 250/397 |
| 9,002,313 | B2 | 4/2015 | Sink et al. | |
| 9,868,391 | B1 * | 1/2018 | Fairfield | B60W 30/0956 |
| 10,291,986 | B1 * | 5/2019 | Plitkins | H04R 5/04 |
| 2002/0183011 | A1 * | 12/2002 | Eddy | H01Q 1/246 |
| | | | | 455/70 |

(Continued)

FOREIGN PATENT DOCUMENTS

| | | | |
|---|---|---|---|
| CN | 205930450 U | * | 2/2017 |
| CN | 108732437 A | * | 11/2018 |

(Continued)

OTHER PUBLICATIONS

International Search Report, International Application No. PCT/US2020/043291, dated Oct. 21, 2020, 5 pages.

(Continued)

*Primary Examiner* — Fekadeselassie Girma
(74) *Attorney, Agent, or Firm* — Merchant & Gould P.C.

(57) ABSTRACT

An example emergency vehicle siren system can include: one or more emergency lights; a siren; and a controller including a processor and memory, the memory encoding instructions which, when executed by the processor, cause the controller to modify a sound of the siren based upon a context of the vehicle, the context including at least one of a speed and location of the vehicle.

20 Claims, 14 Drawing Sheets

(56) References Cited

U.S. PATENT DOCUMENTS

| | | | | |
|---|---|---|---|---|
| 2003/0126462 | A1* | 7/2003 | Howard | H04W 12/126 |
| | | | | 726/21 |
| 2005/0282578 | A1* | 12/2005 | Vander Veen | H04M 1/2757 |
| | | | | 455/551 |
| 2010/0245581 | A1* | 9/2010 | Koyama | G08G 1/0965 |
| | | | | 348/149 |
| 2013/0311035 | A1* | 11/2013 | Czyz | G01S 13/87 |
| | | | | 342/52 |
| 2015/0127212 | A1* | 5/2015 | Chacon | G01S 19/14 |
| | | | | 701/32.4 |
| 2016/0355179 | A1 | 12/2016 | Cannella et al. | |
| 2018/0292822 | A1* | 10/2018 | Ichikawa | G06V 20/58 |
| 2020/0182636 | A1* | 6/2020 | Ningthoujam | G08G 1/096725 |
| 2021/0364161 | A1* | 11/2021 | Acker | B60R 16/033 |
| 2022/0108207 | A1* | 4/2022 | Graf | G06N 20/00 |

FOREIGN PATENT DOCUMENTS

| | | | | |
|---|---|---|---|---|
| CN | 208915065 U | * | 5/2019 | |
| CN | 110001446 A | * | 7/2019 | ............ H02J 3/32 |
| DE | 20007584 U1 | * | 8/2000 | |
| JP | 3147168 U | * | 12/2008 | |
| JP | 5040634 B2 | * | 10/2012 | |
| JP | 2016179802 A | * | 10/2016 | |
| KR | 101558255 B1 | * | 10/2015 | |
| WO | WO-2018088758 A1 | * | 5/2018 | |

OTHER PUBLICATIONS

Written Opinion of the International Searching Authority, International Application No. PCT/US2020/043291, dated Oct. 21, 2020, 8 pages.

* cited by examiner

SELF-ADAPTING VARIABLE LOUDNESS AND/OR VARIABLE SOUND PATTERN EMERGENCY VEHICLE SIREN SYSTEM WITH OPTIONAL COLLISION WARNING

INTRODUCTION

Vehicular emergency warning sirens are used in conjunction with emergency warning lights to inform the public that an emergency vehicle is in emergency response mode traveling to an emergency scene. For example, when an emergency vehicle is asking for the right of way in traffic, both the siren and the emergency warning lights are operating together at maximum capacity to provide the most effective warning to the public. When the emergency vehicle is stopped or in blocking mode, the siren is no longer necessary and only lighting is used to provide warning of the vehicle's presence.

Early emergency vehicle sirens were electromechanical designs that used a motor to spin a rotor inside of a stator. Those sirens could only create the slowly varying "wail" tone as the mass of the mechanical motor coupled to a rotor assembly combined with the limited torque of the motor, set the inertial limitations that prevented the siren from being able to change the rotor speed quickly. These sirens were activated by repetitively applying battery power and disconnecting battery power to the motor. During application of battery power, the siren would rise in frequency. When disconnected, the siren rotor would slow or coast down, causing the siren frequency to fall.

In the late 1960s and early 1970s, electronic sirens that used a horn loudspeaker combined with an electronic tone generator and amplifier gained acceptance. This change paved the way for a second siren tone, the "yelp" tone, to gain acceptance and become the second recognized siren tone in the US.

Today, although other electronically generated emergency vehicle tones can be generated, the "wail" tone and the "yelp" tone remain as the only two recognized emergency vehicle siren tones by California law and by the SAE J1849 emergency vehicle siren recommended practice.

SUMMARY

In one aspect, an emergency vehicle siren system includes: one or more emergency lights; a siren; and a controller including a processor and memory, the memory encoding instructions which, when executed by the processor, cause the controller to modify a sound of the siren based upon a context of the vehicle, the context including at least one of a speed and location of the vehicle.

In another aspect, an emergency vehicle includes: one or more emergency lights; a siren; and a controller including a processor and memory, the memory encoding instructions which, when executed by the processor, cause the controller to modify a sound of the siren based upon a context of the vehicle, the context including at least one of a speed and location of the vehicle.

In yet another aspect, a method of providing a siren for an emergency vehicle includes: generating a siren; and automatically modifying a sound of the siren based upon a context of the vehicle, the context including at least one of a speed and location of the vehicle.

DETAILED DESCRIPTION

Figure 1:
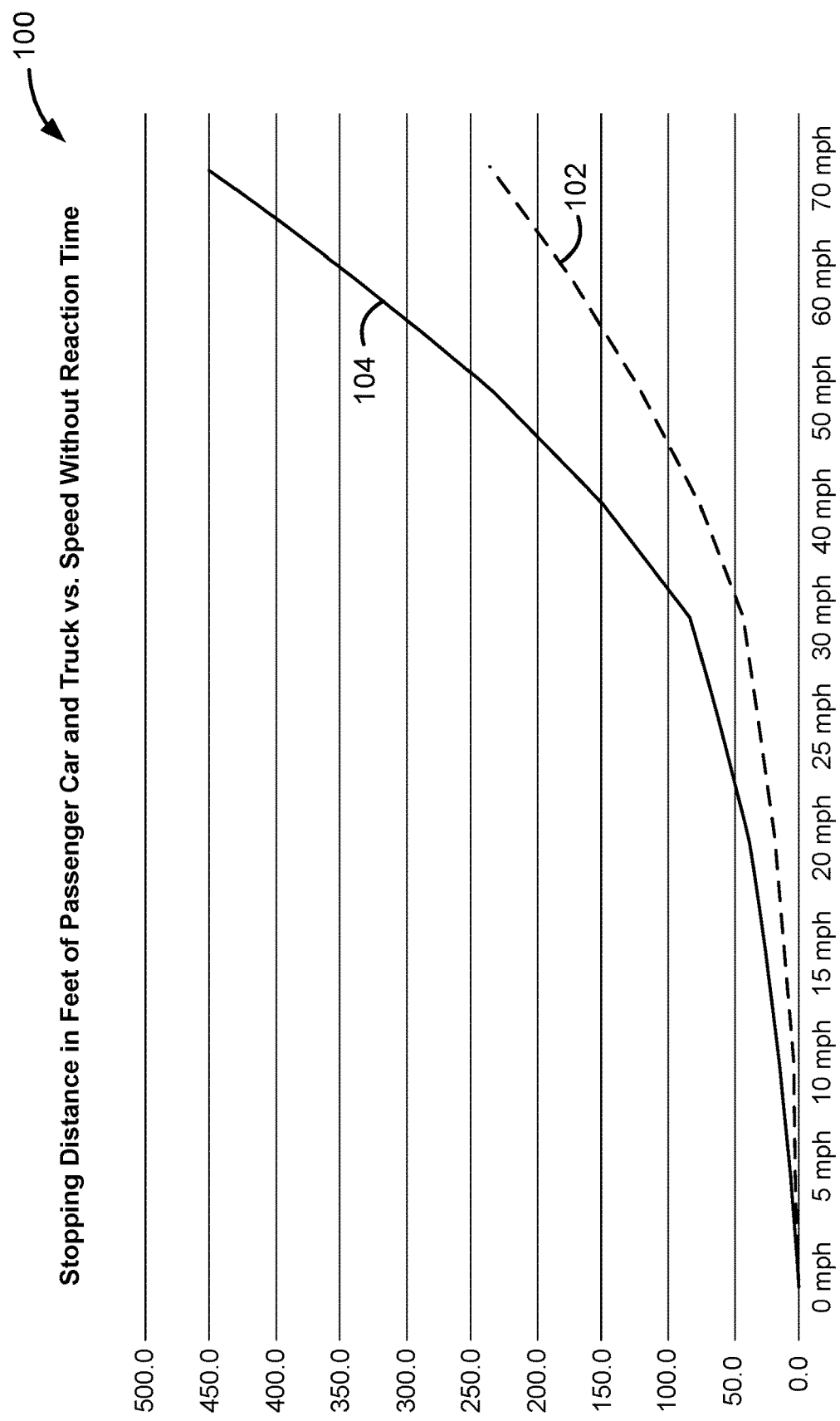
FIG. 1 is an example graph showing stopping distances for sedans and trucks at various speeds.

There are three aspects to understanding how an emergency warning siren warns and all three aspects involve physics of acoustics and human factors: detection, recognition, and response.

Detection:

For a siren, detection is the ability to hear or discern a signal within or above local noise levels. The level of the siren needs to be high enough to raise our awareness and get us to begin listening more carefully to the siren sound. Detection is closely related to loudness of the sound and our ability to separate the sound from other sounds. In most cases, sounds in the middle range of our hearing have an advantage for detection, as we are most sensitive to sound in the middle range of our hearing, but sound masking caused by noise at lower or similar frequencies can reduce our ability to detect a signal, even in the middle range of our hearing.

Recognition:

Recognition is our ability to associate the sound that we have detected with a learned sound that we know. Pitch changes, temporal repetition, frequency and harmonic content all combine to create the fingerprint of a sound such as an emergency vehicle siren, so that we recognize the standard "wail" or "yelp" as a siren sound.

Response:

Prior to responding, we need to make a decision. That decision is whether the siren is near or far, or if the siren we hear is of concern or not. This is where recognition and response overlap slightly, but our brain can determine this quickly. Our brain can determine by listening to the sound level, recognizing harmonic content and measuring the ratio of direct field sound versus reflected/ambient sound, whether the siren is near or far. We do this analysis as second nature, without even realizing we have done so.

If we decide that the siren sound we hear is distant and of no concern, our response should be to continue on with our activities. If we realize that the siren is near, then we should use learned responses and begin to use our eyes to locate the emergency vehicle, monitor the traffic flow around us and take action to safely get out of the way of, or stop to avoid a collision with the emergency vehicle.

Legislation to reduce noise in cities has been present for many years, but has become a subject of greater interest in recent years as cities continue to work to reduce urban noise by setting maximum sound levels on vehicle exhaust systems, vehicle sound systems, trucks, worksites, etc.

Generally, emergency vehicle sirens have been exempt from noise legislation, as safety to the public overrides the nuisance of siren noise. However, the city of New York, for example, has considered legislation to reduce urban noise by changing their emergency vehicle siren tones away from the US recognized emergency siren tones of "wail" and "yelp" to the European "High-Low" tones that produce lower sound output.

In the state of California, the use of the European High-Low tone on an emergency vehicle would be illegal, as the High-Low tone is not a recognized siren tone by the California code of regulations, Title 13. The SAE J1849 recommended practice does allow for the use of other siren tones, but the SAE J1849 recommended practice requires that the non-standard tone used must meet the required minimum sound output levels and makes it the responsibility of the department/user to train the public to recognize that non-standard tone as an emergency vehicle warning siren.

There are key reasons why the European High-Low tone is inferior to using the US "wail" and "yelp" tones.

Because only two tones are used in the High-Low tone, in an environment with higher noise levels, especially narrower band noises caused by brakes squealing, backup alarms, music, etc., there is a greater chance that one of the tones or possibly both of the tones could be masked from our hearing by those other noises. By the US "wail" and "yelp" tones constantly varying in pitch, the chance for narrow band noises to mask the siren tone is reduced because the siren is constantly moving to another frequency instead of just stepping between two steady tone frequencies.

Both tones in the European High-Low tone are at the lower frequencies of the US "wail" and "yelp" tones. This is why the US wail and yelp tones produce higher sound output. Although lower frequency tones penetrate objects better, compression driver/horn designs used in emergency vehicles are compact and generally do not produce as much sound output at these lower frequencies. The US wail and yelp tones are designed to sweep through the peak output frequency of the siren speaker, maximizing the siren's sound output.

Over recent years, sirens in the US have greatly increased their low frequency sound output by using low frequency transducers operating in conjunction with the compact compression driver/horn designs. This type of unit is marketed by Federal Signal Corporation under the name "Rumbler." The siren maintains compliance to the US standards as the compression driver/horn design meets the sound level output requirements for "wail" or "yelp", while the low frequency transducer provides extra low frequency energy as it follows the constantly rising and falling sound of the siren tone, only one or two octaves lower on the musical scale.

These extra low frequency transducers could be added to the European siren systems, but there would still be the limitation of the High-Low tone only using two frequencies rather than sweeping through frequencies to minimize the effects of sound masking.

These low frequency siren enhancement devices do have use limitations, as the low frequency sound penetrates vehicle structures so well that it also penetrates the emergency vehicle's structure. This penetration of the low frequency sound from these devices increases the sound levels for the occupants in the emergency vehicle, so these devices are activated manually by the emergency vehicle driver as necessary at intersections where more warning is needed, but then automatically time out to turn off the low frequency transducer to reduce the sound levels in the emergency vehicle. For this reason, these low frequency transducer systems are limited to intersection use or where extra emergency warning is needed for a short period of time.

What is described herein is an example of a multi-method approach to a siren system design that resolves the issue of reducing urban siren noise while maintaining emergency vehicle siren warning effectiveness and recognition.

As we think about emergency vehicle operation and the right of way in traffic, we realize that the emergency vehicle operator is unable to control or predict speeds or reaction times of public vehicles approaching the emergency vehicle. So, we need to approach the issue of siren noise from the perspective of the emergency vehicle, as this is the variable that can be controlled through siren design and emergency vehicle driver training.

Our goal will be to take advantage of additional reaction time available to the emergency vehicle operator when the emergency vehicle is moving slowly and therefore has a shorter stopping distance. This shorter stopping distance provides additional time for the emergency vehicle operator to react and stop the emergency vehicle to avoid a hazard. The reaction time at lower speeds provides us with the opportunity to reduce the siren's sound level/effective warning distance.

One method is to solve the issue of the siren operating at full loudness even though the emergency vehicle is stopped in congested urban traffic. Though the siren is heard, there is little that public drivers can do to get out of the way, as traditional passenger vehicle and truck designs can only move forward or backwards. Current vehicle designs cannot move sideways.

In this situation when the emergency vehicle is unable to move due to stopped traffic, full siren power may not be necessary. In extreme traffic congestion, the siren cannot reduce the time to get to the emergency scene since the vehicles blocking the way are unable to clear a path. An emergency vehicle in blocking mode (stopped) is not required to have the siren in operation for compliance with SAE J1849 or California Title 13.

At low speeds, the stopping distance of the emergency vehicle is very short, as little as five feet or less for a sedan at five miles per hour. This short stopping distance combined with the low speed provides more reaction time for the emergency vehicle operator to react, so warning distance for the siren could be reduced from full power and set to a level sufficient to maintain overall time to stop the emergency vehicle that is equivalent to the overall time to stop time at higher speeds. Refer to FIG. 1 for a graph 100 of the stopping distance of sedans 102 and heavy trucks 104 without considering reaction time distance.

Figure 2:
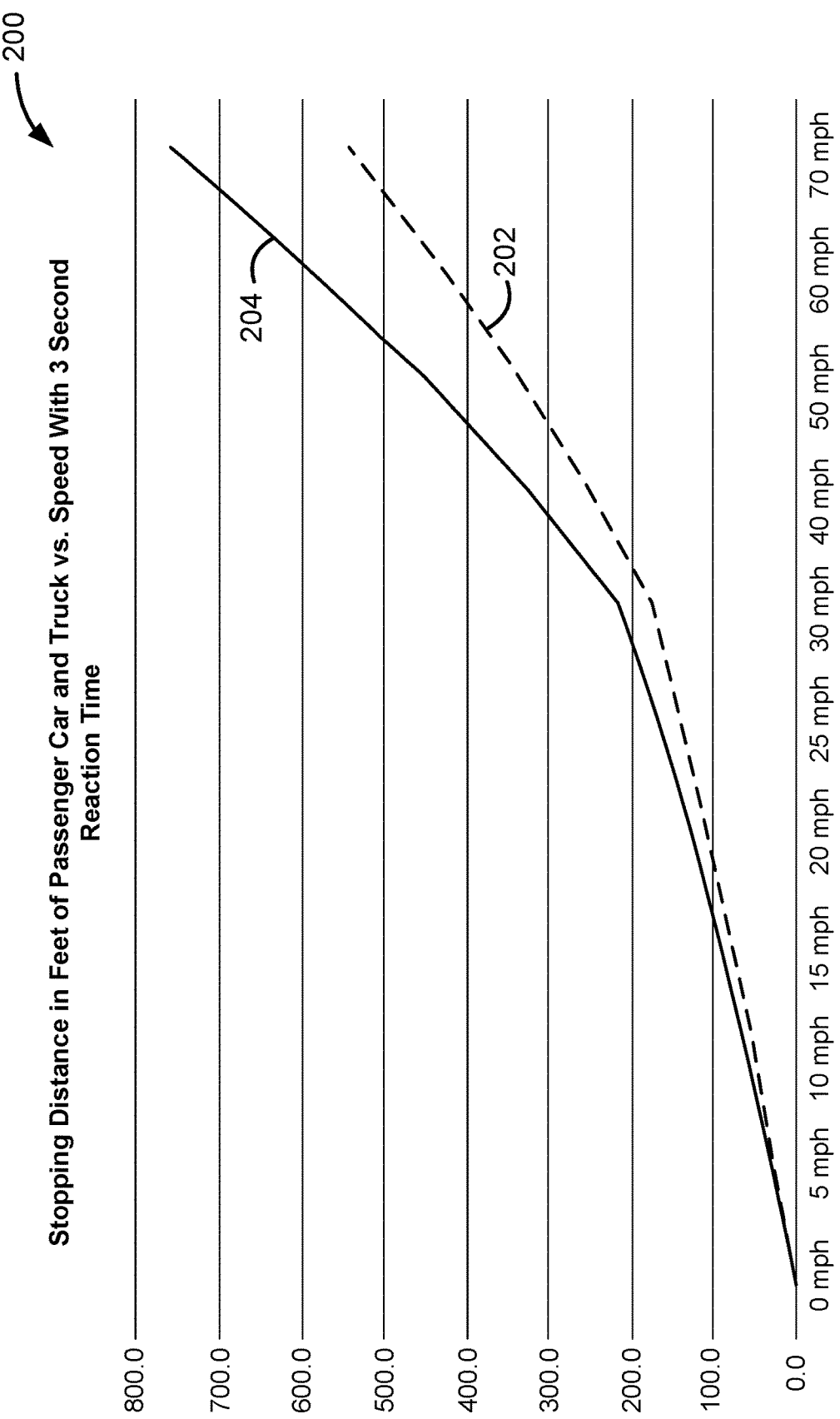
FIG. 2 is another example graph showing stopping distances for sedans and trucks at various speeds including reaction time.

Using a reaction time of 3 seconds for the emergency vehicle driver is a conservative approach, as studies show that the average reaction time for someone to react to a problem when driving a vehicle is 1.5 seconds. With this in mind, we can add the reaction time travel distance to the overall distance to stop the vehicle. Refer to FIG. 2 for a graph 200 of the distance to stop the vehicle when including a 3 second reaction time. Notice that the stopping distance between a truck 204 and a sedan 202 are much closer at lower speeds when reaction distance is added to the total distance to stop.

Applying the principle of preserving the reaction time of 3 seconds for the emergency vehicle operator to respond and stop the emergency vehicle, a curve or steps can be derived to interpolate the warning distance needed by the siren and the associated siren power level needed to maintain the 3 second reaction time to stop the emergency vehicle.

Figure 3:
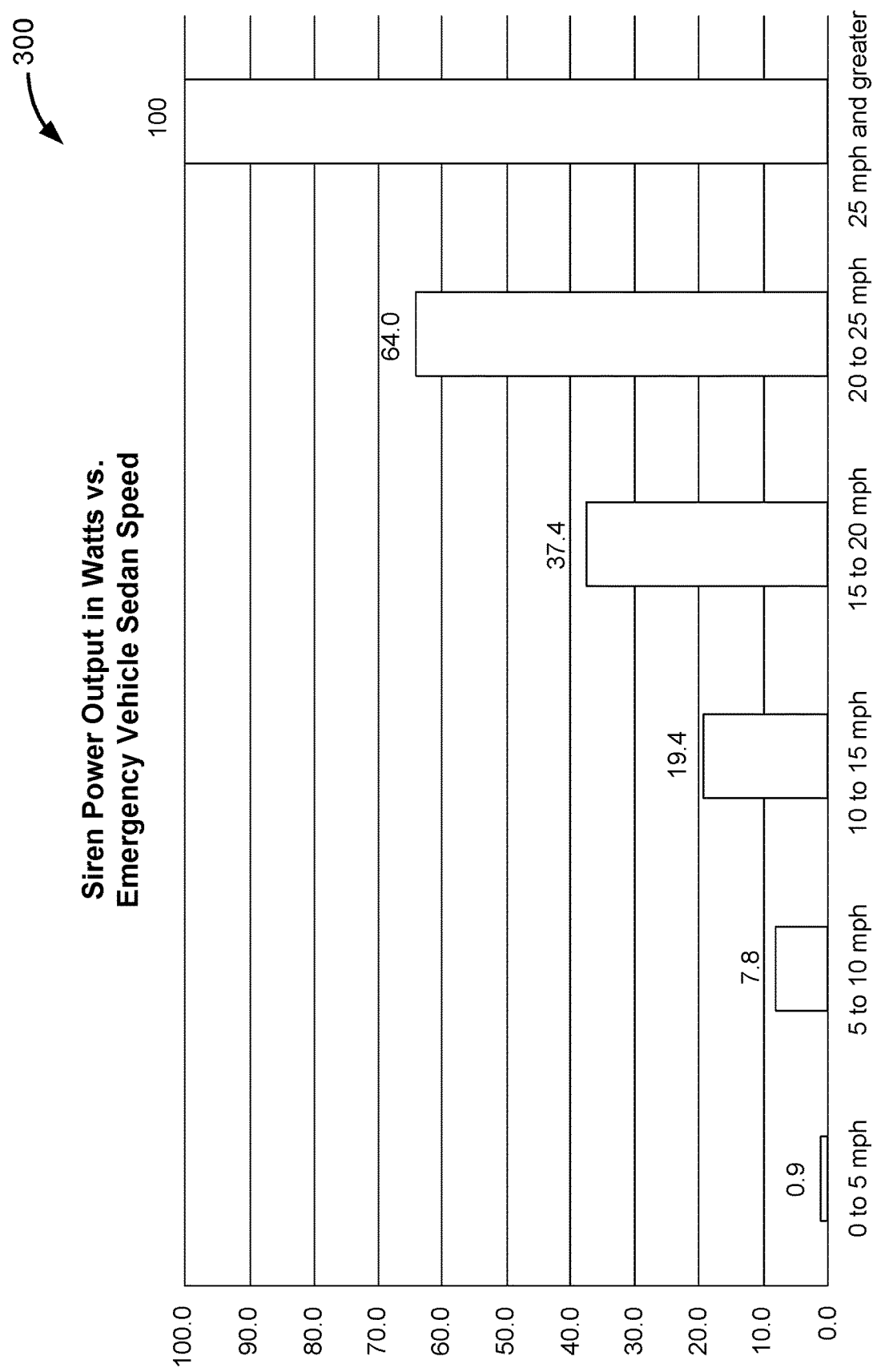
FIG. 3 is an example bar graph showing siren power output versus speed for sedans.
Figure 4:
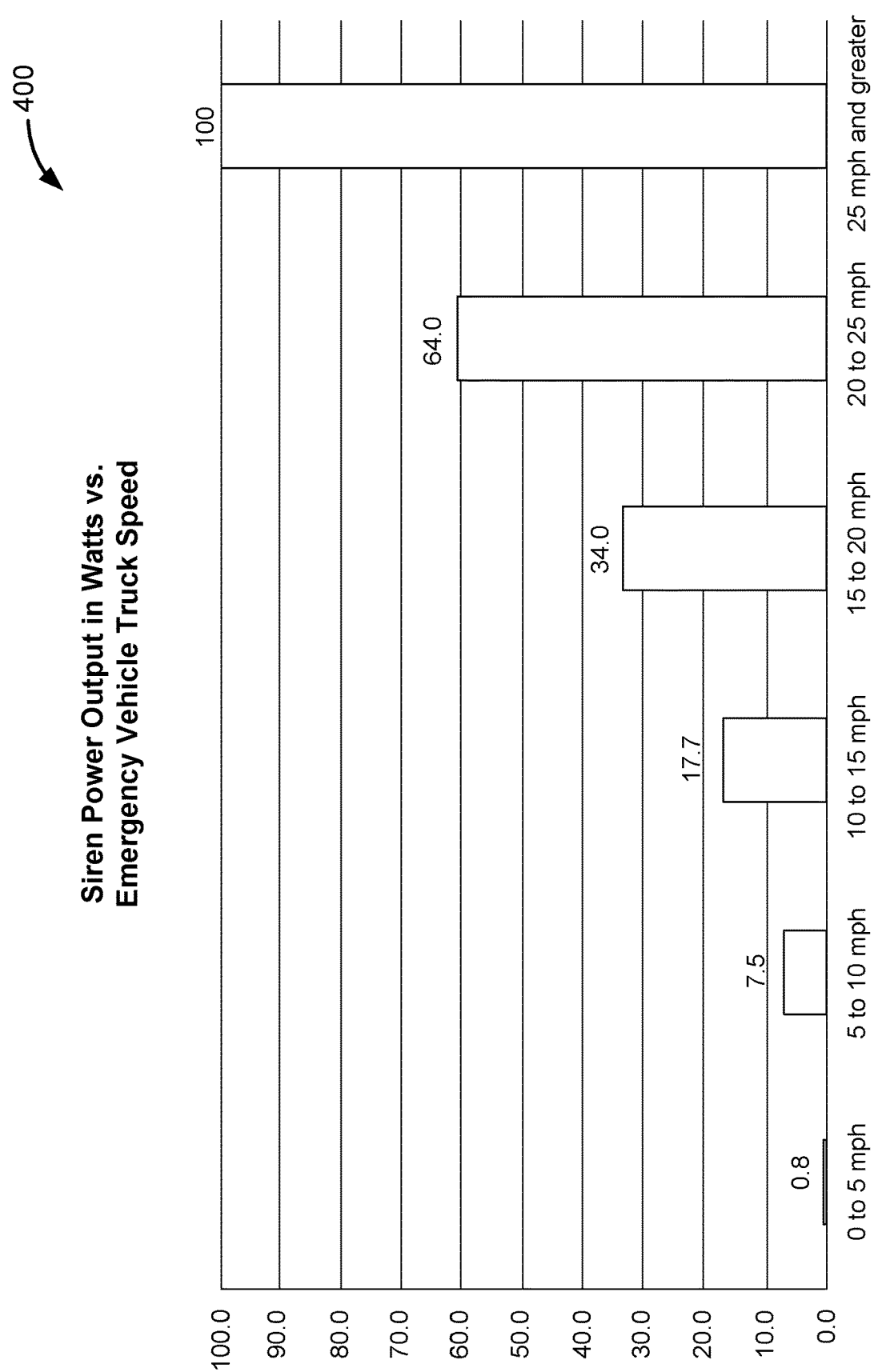
FIG. 4 is another example bar graph showing siren power output versus speed for trucks.

Considering the theory of preserving reaction time at speeds below 30 mph, the siren's sound output could be reduced in power/sound level output when the emergency vehicle is traveling at slower speeds. Refer to FIG. 3 for a bar graph 300 for a sedan and FIG. 4 for a bar graph 400 for a truck, for the varying siren power levels needed at lower speeds.

Figure 5:
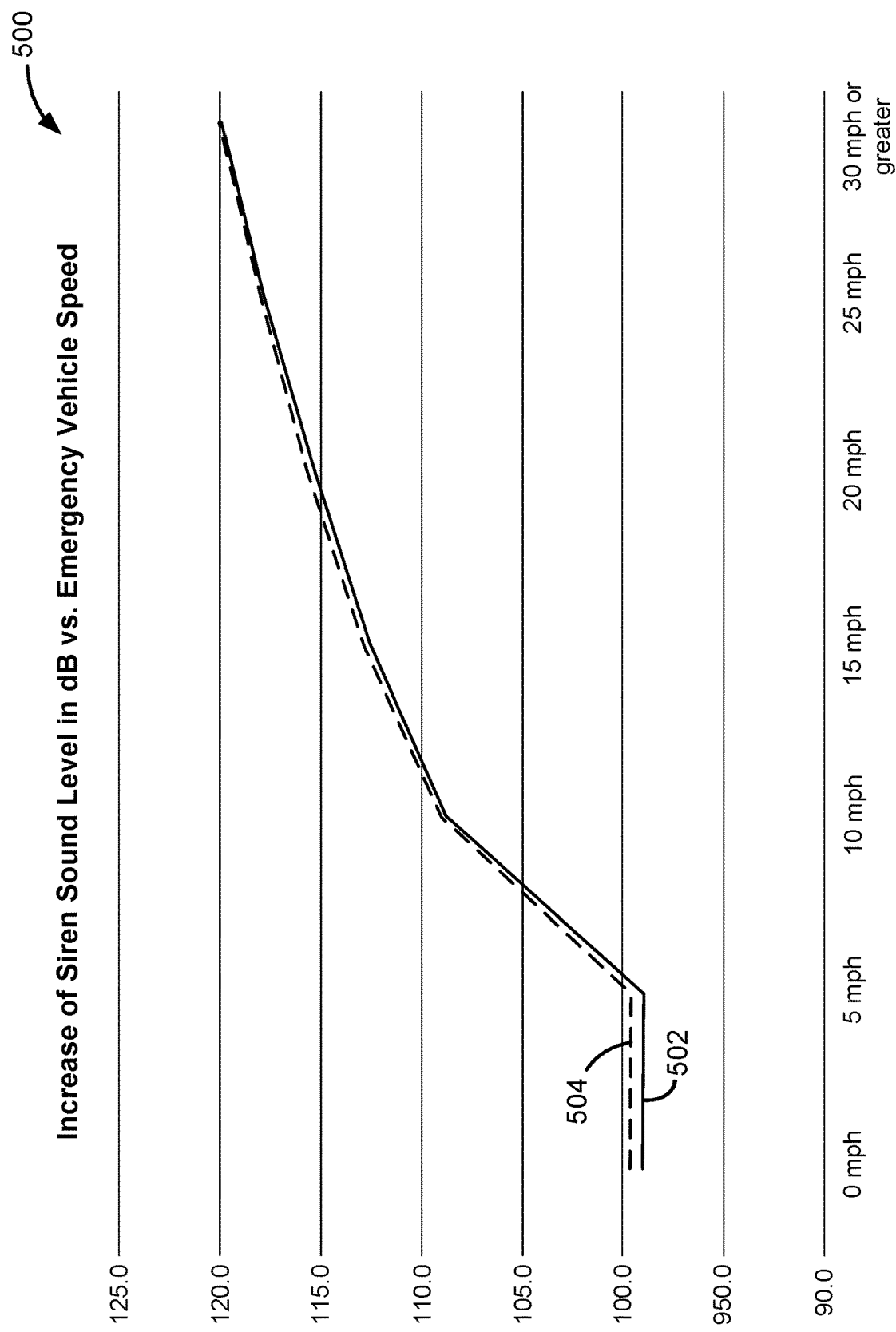
FIG. 5 is another example graph showing siren sound level versus speed for emergency vehicles.

What is shown is that greater warning distance (increasing siren power and sound level in dB) is needed to compensate for the increased speed and stopping distance of the vehicle. This may also mean that less warning distance may be sufficient at slower speeds. At slower speeds, it may be feasible to reduce the power level for the siren to reduce urban noise. The steps in the sound levels could also be smoothed using much smaller steps to create a curved line for the siren power output in relation to vehicle speed. Refer to FIG. 5 for a graph 500 of siren sound pressure levels needed to compensate for increased emergency vehicle speed for sedans 502 and trucks 504. A minimum siren level of approximately 100 dB is necessary to stay over urban ambient noise levels.

What is interesting to note when comparing the sedan chart to the large truck chart is that the siren sound levels are quite similar. This is because the three second reaction time has a significant impact on the stopping distance for both vehicle classes.

To be conservative, the siren should use full power to produce as large and round of warning pattern as possible above 30 mph, as the average warning distance of an emergency vehicle siren is between 350 and 400 feet which equates to a 40 to 45 mph stopping distance for an emergency vehicle truck and 49 to 56 mph stopping distance for a sedan. So, at 30 mph, a sedan or a truck could stop in less distance than needed to avoid a collision when the siren is operating at full power, 100 watts.

In the past few years, it has become more common for emergency vehicle sirens/controllers to read the Controller Area Network (CAN)/serial communications bus on the emergency vehicle. Most vehicles have at least two buses, a slow bus speed for body control functions like lights, doors open, windows, door locks, etc., and a high-speed bus that handles engine speed, transmission functions and braking. By connecting to these buses, a siren controller can read commands between the modules on the vehicle. One of those commands is the speed command. It is sent continuously on the CAN/serial bus between control modules on the vehicle.

Summary of Method One for Reducing Urban Siren Noise—Low Speed Power Reduction:

By reading the vehicle's speed commands on the CAN bus or by receiving Global Positioning System (GPS) data from the integrated light bar per Sink et al. (U.S. Pat. No. 9,002,313), the siren can automatically reduce the sound output at lower speeds to reduce siren noise by means of digital or analog attenuation or by opening sound files of different amplitudes, or by synthesizing different level siren tones with a microcontroller or digital signal processor, since full sound output may not be necessary at lower speeds.

Through software programming using lookup tables, attenuation steps or constant adjustment of attenuation levels, siren sound levels could be matched to the emergency vehicle size and weight to compensate for different stopping times and or driver response times for various sized/weight emergency vehicles.

For example, an emergency vehicle's profile can be added to the emergency vehicle siren's memory using programming software, so the siren uses the correct varying loudness curve based on the profile of the emergency vehicle. The example choices in the software can be: "Sedan", "SUV", "Medium sized truck", "Large truck", etc. In this example, "Sedan" and "SUV" can be for police vehicles, and "Medium sized truck" and "Large truck" can be the choices for an ambulance or a fire apparatus. The programmed of the profile in this manner allows the siren responses described herein to be tailored to the type of vehicle.

Method Two for Reducing Urban Siren Noise—Video Analytics and Radar for Siren Power Adjustment:

Further enhancement of the siren sound level control can be performed by observing the environment around the emergency vehicle using video analytic processing or radar detection.

Video cameras or radar detectors in the light bar or on the emergency vehicle per U.S. Pat. No. 9,002,313 would provide data on a serial network in the vehicle. That data would be processed by a digital signal processor that is either in each camera or radar transceivers to reduce network traffic or within a central processor in the vehicle. A single data stream from a 360-degree view camera could be unwrapped or data streams from multiple non-360-degree cameras could be processed by the analytics processor.

The processing algorithms would search for and identify buildings, vehicles, motorcycles, trucks, bicycles and pedestrians stopped and moving and would calculate velocity information about those objects relative to the emergency vehicle.

Figure 6:
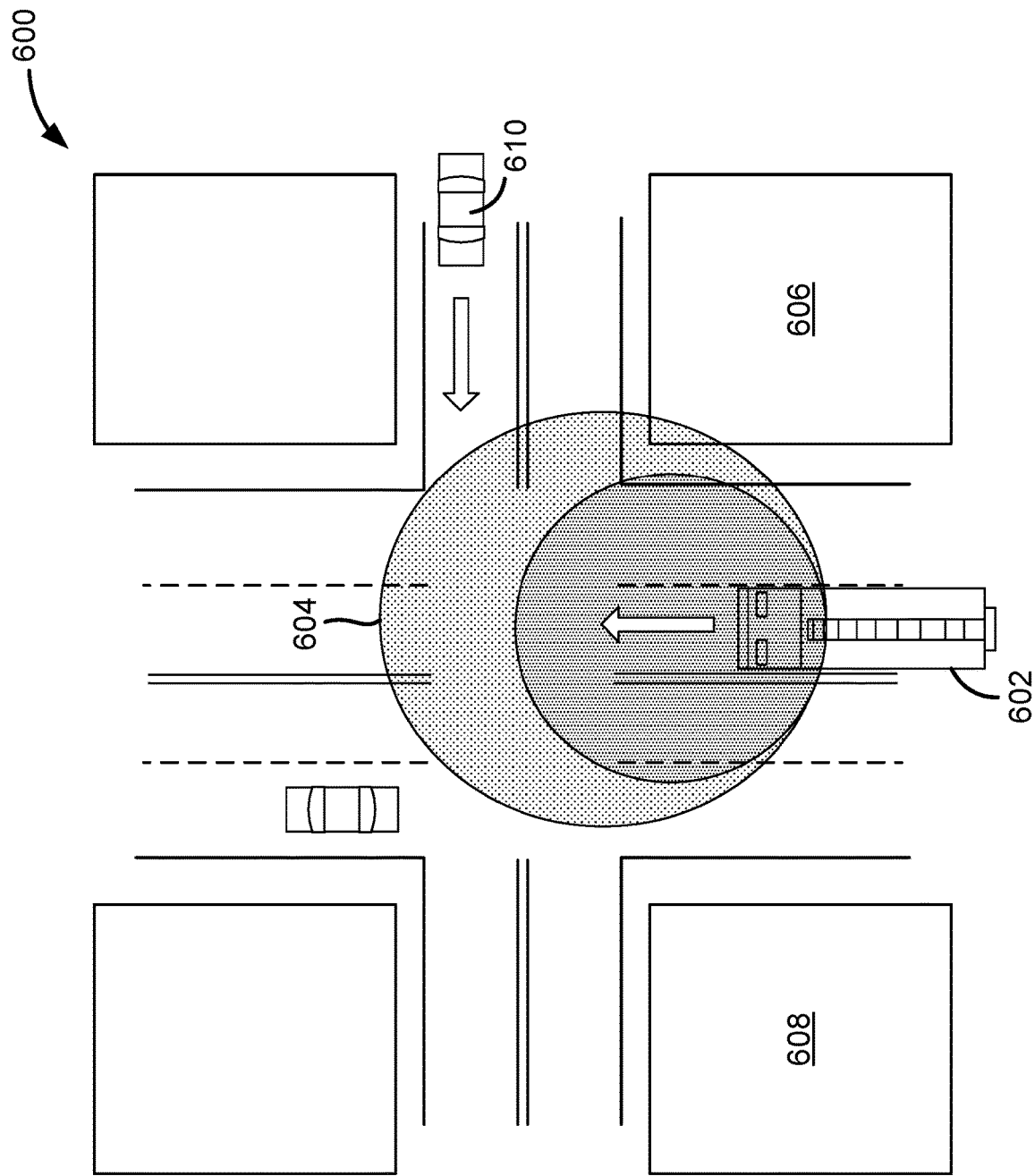
FIG. 6 is an example environment including an intersection.

Refer to the environment 600 shown in FIG. 6. The emergency vehicle 602 is in emergency response mode. The siren controller has read through the vehicle's CAN bus that it is night as the headlights are activated on the emergency vehicle and the video analytic software has recognized that it is dark around the vehicle. The emergency vehicle driver is using proper driving technique and has slowed the vehicle as it approaches the intersection. The siren/controller has reduced the sound levels for the siren 604 (audible siren sound lobe visually depicted in the figure) as by reading data on the CAN bus, the ground speed of the emergency vehicle has dropped to 10 mph.

Figure 7:
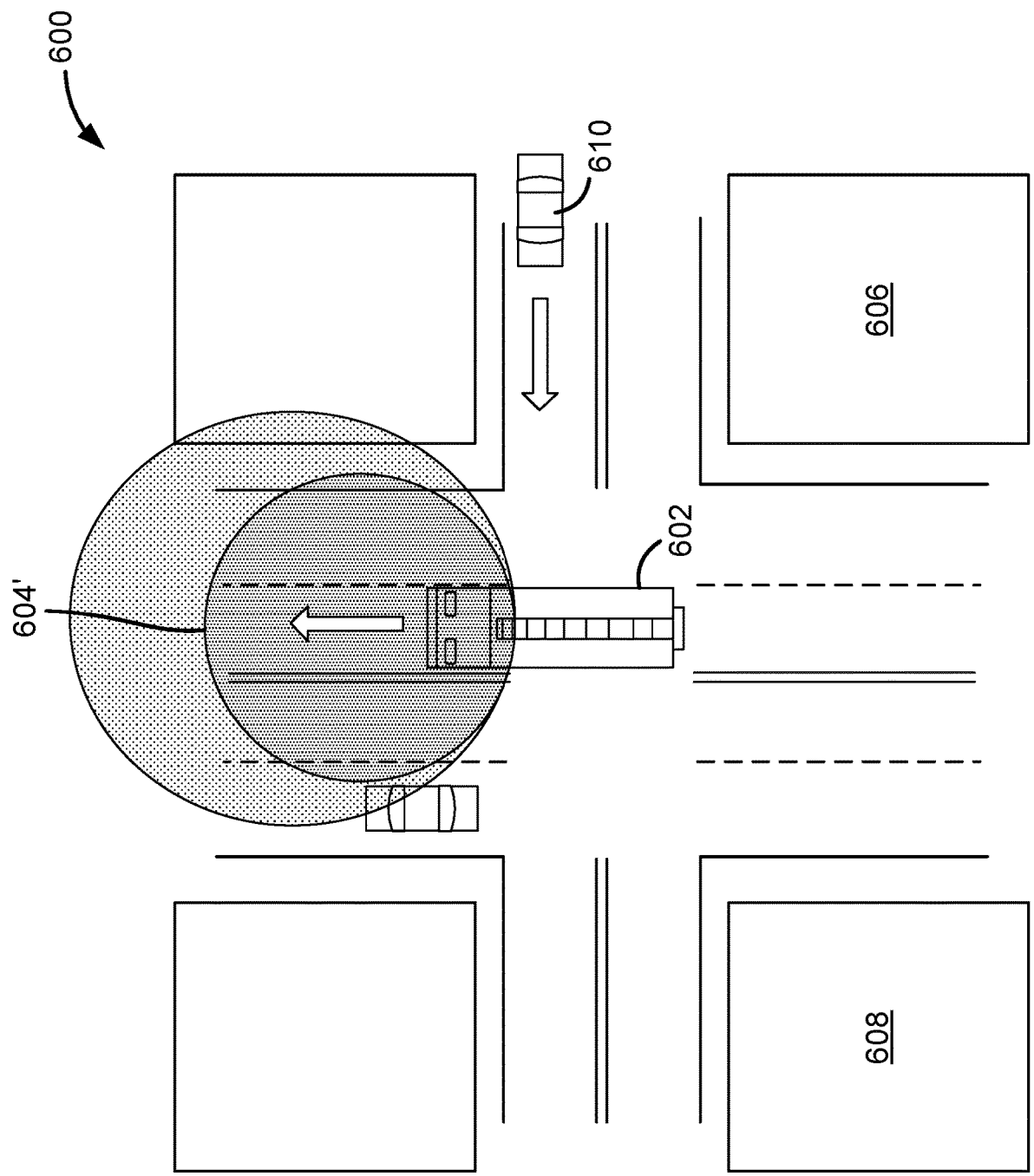
FIG. 7 is another example environment including an intersection.

As the emergency vehicle 602 enters the intersection, the cameras or radar are no longer blocked by the corners of the buildings 606, 608 and the cameras or radar system pick up a vehicle 610 moving and have identified that the velocity of the vehicle 610 is on a collision path with the emergency vehicle 602. The siren system would raise the sound level of the siren 604 to increase warning distance to provide earlier warning to the approaching vehicle 610. If the approaching vehicle 610 stops or changes direction away from the emergency vehicle 602, the video analytic processing or radar processing would report to the siren controller that the vehicle 610 is no longer on a collision course and the siren controller could lower the power level of the siren 604', per FIG. 7.

Figure 8:
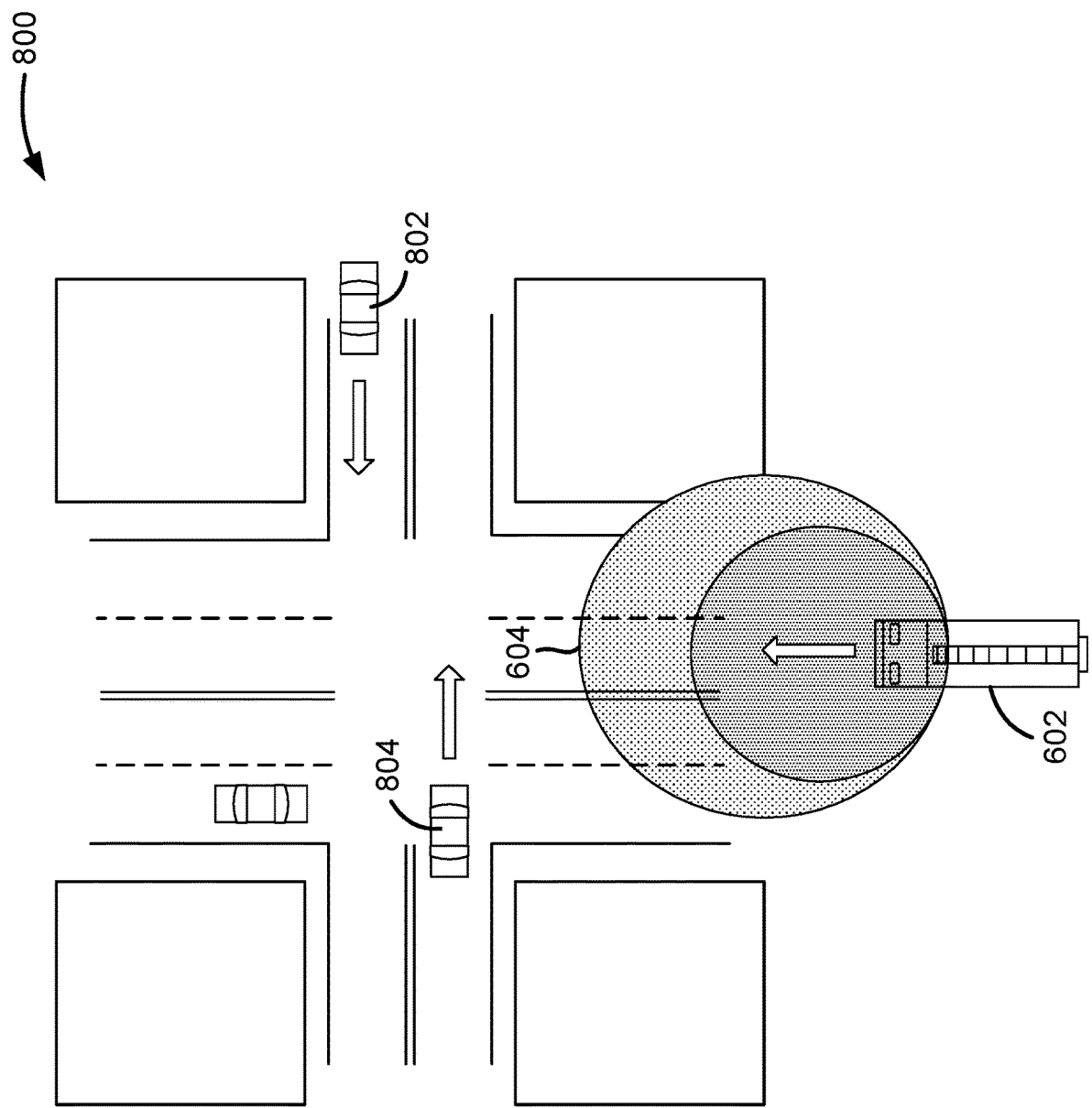
FIG. 8 is another example environment including an intersection.

Another example would be that the emergency vehicle 602 has slowed as it approaches an intersection as shown in the environment 800 of FIG. 8, but the video analytics or radar analysis shows that there is a significant amount of traffic 802, 804 crossing ahead at the intersection that the emergency vehicle 602 is approaching. The siren controller sound level would be increased for the siren 604, (instead of decreased) to a higher power level to increase the level of warning to those in and approaching the intersection that an emergency vehicle is asking for the right of way. When movement in the intersection has ceased and the intersection is clear, the siren sound level could drop back to a level that is appropriate for the emergency vehicle's speed.

Figure 9:
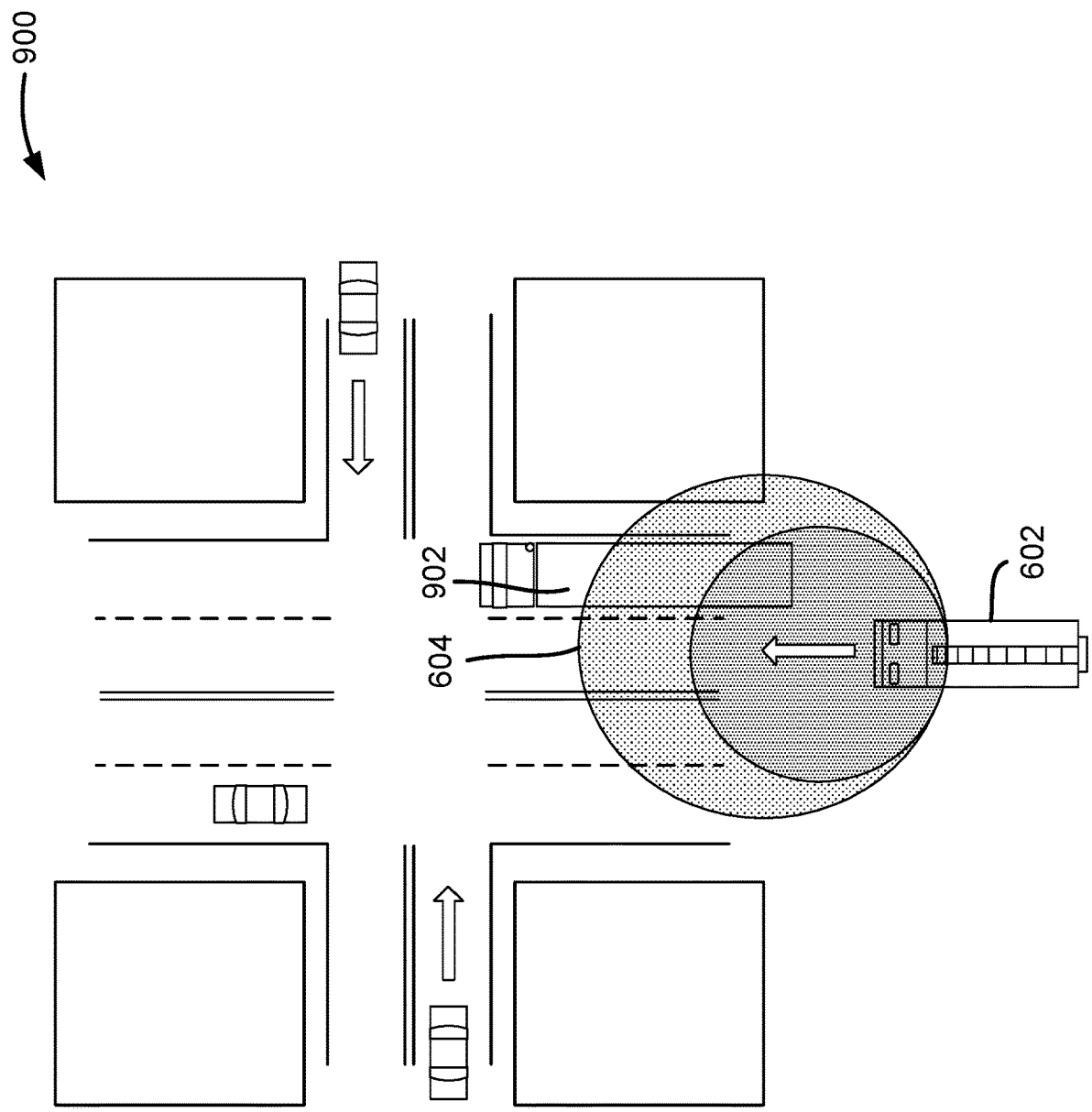
FIG. 9 is another example environment including an intersection.

Refer to the environment 900 of FIG. 9 for another example when the video analytics processor or radar processor detects a large vehicle 902 like a truck in front of or surrounding the emergency vehicle 602, or perhaps blocking the view of the intersection. The analytics processor could instruct the siren controller system to use full power for the siren 604, as the emergency vehicle lights may not be visible due to obstructions.

Now that we have the ability to detect day versus night in the emergency vehicle 602, research could be done to see if it is safe to reduce night time levels for the emergency vehicle siren as recent studies have shown that the emergency warning lights are more effective at night than during the day. By using video and radar analytics and by reading the CAN/serial data on the vehicle, the emergency vehicle siren controller could change to night mode and further reduce siren sound levels, as the conspicuity of the emergency warning lighting system is increased at night.

Video and radar analytic processing could also be used to automate the low frequency siren enhancing system like the Rumbler. Currently, low frequency enhancing units need to be activated manually by the emergency vehicle operator, as these devices are used temporarily in intersections. By analyzing structures around the emergency vehicle and predicting entry into an intersection with approaching traffic, the video analytics processor could send a message to the siren controller and automatically enable the low frequency siren enhancer to further improve intersection warning. This further frees the emergency vehicle operator to concentrate on driving conditions and collision threats, which could further reduce the chances for a collision.

Method 3 for Reducing Urban Siren Noise—Siren Sound Field Steering/Beam Shaping:

Using a plurality of speakers or a single speaker with a plurality of transducers, beam shaping of the siren sound could be achieved by using a microcontroller or digital signal processor to vary the phase and amplitude between the plurality of transducers to redirect the siren sound to areas around the emergency where the video and radar analytics system has detected vehicle or pedestrian movement or has predicted that the velocity of a moving object is towards the emergency vehicle.

Siren speakers in the multi-speaker array could also be mounted to the sides of the emergency vehicle to maximize side warning capability or a single transducer/speaker system could be rotated mechanically to steer the sound pattern.

Data shows that the majority of emergency warning vehicle crashes occur from the sides. Considering this, it is possible to beam steer or affect the shape of the lobe of the siren signal to send more acoustic energy where needed, by using the video analytics and radar processing data as a guide for beam shaping.

Figure 10:
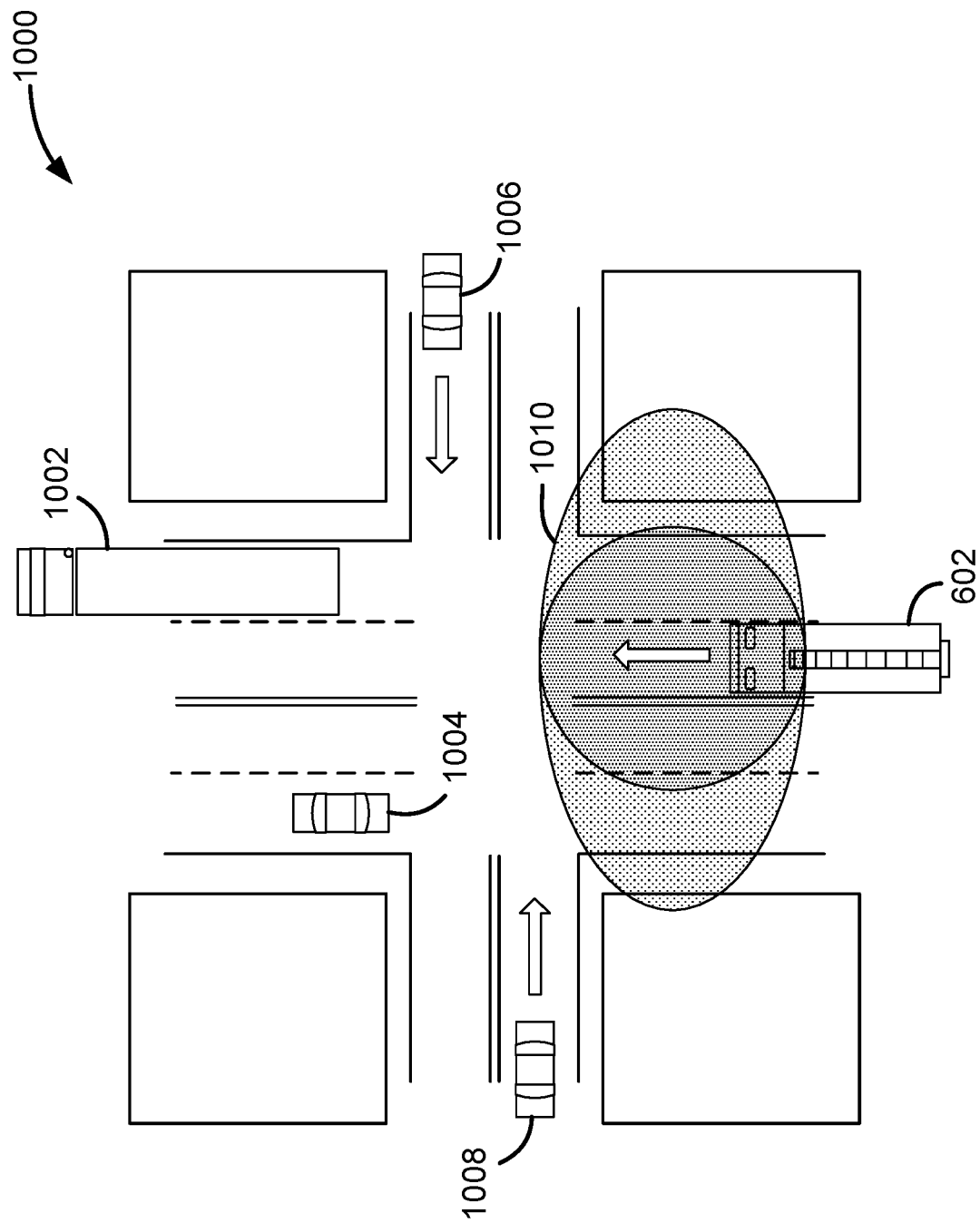
FIG. 10 is another example environment including an intersection.

Refer to the environment 1000 of FIG. 10 as an example. The emergency vehicle 602 is approaching an intersection. The video analytics or radar system have determined that the vehicles 1002, 1004 straight ahead of the emergency vehicle 602 have moved to the side and cleared a path ahead, but as the emergency vehicle 602 enters the intersection, the video analytics system detects that vehicles 1006, 1008 are continuing to move towards the emergency vehicle 602 from both sides. The siren system controller could change the phase relationship of the siren speakers or energize side-firing speakers to focus the sound energy currently going to the front of the emergency vehicle and redirect the siren 1010 to the sides of the emergency vehicle 602, increasing the warning distance to both sides of the emergency vehicle 602.

Figure 11:
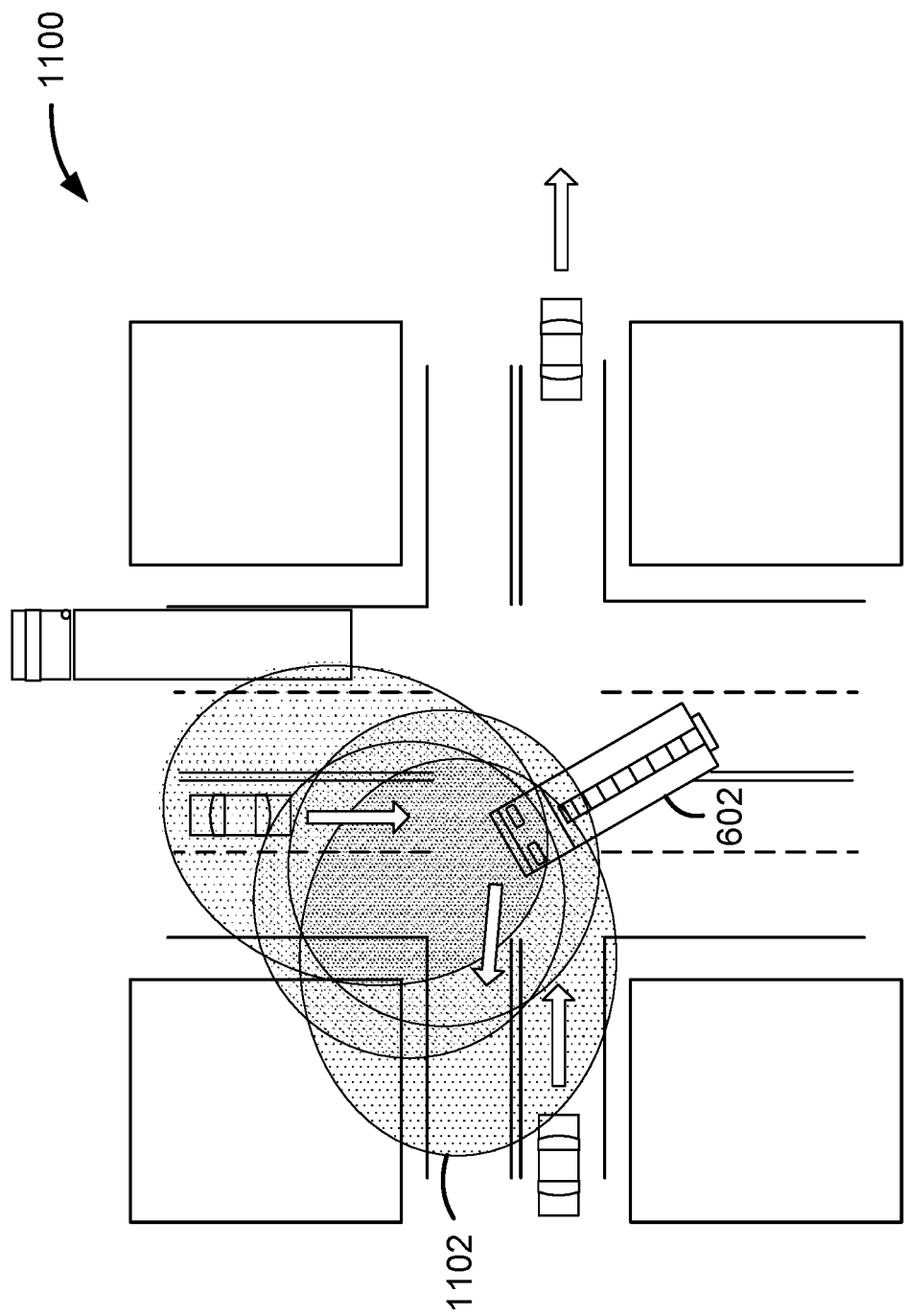
FIG. 11 is another example environment including an intersection.

Refer to the environment 1100 of FIG. 11 for another example. The emergency vehicle 602 could be entering an intersection, but is now turning left, instead of proceeding straight. The siren system controller, by reading the vehicles CAN/serial bus data, detects that the steering wheel is being turned to the left. The system controller would look at the video analytics and radar data and determine that there are no vehicles approaching from the right and that the siren sound lobe 1102 should therefore be shifted away from the right side of the emergency vehicle and towards the area that the emergency vehicle 602 is turning into. Of course, if there were vehicles moving towards the emergency vehicle from the right, the system could maintain as round as possible pattern or increase the power to maximum to clear the intersection at all sides.

Summary of Methods for Reducing Urban Siren Noise:

By analyzing data received from the emergency vehicle's CAN/serial bus, the video analytics processor and the radar system, the emergency vehicle siren/controller can make decisions about the emergency vehicle's speed, direction, braking, acceleration, etc., and the movement of objects around the emergency vehicle and objects blocking line of sight, to adjust the sound levels and sound dispersion pattern of the emergency vehicle siren and to direct sound energy where needed most, and reduce sound energy where not needed. By controlling the sound level and lobe shape of the siren signal, less siren sound power would be necessary to provide sufficient warning protection for the emergency vehicle. Less siren sound power correlates to lower overall urban siren noise. The methods described in this document could also be applied to low frequency siren enhancement systems, such as the Rumbler.

At speeds above 30 mph, the system controller would transition to full power in all directions as the ground speed of the emergency vehicle and the reaction time of the emergency vehicle operator would limit the ability of the system to warn the emergency vehicle driver with enough time to react. These higher ground speeds would also require faster camera frame rates and greater radar data processing speeds and faster video analytics processing to be able to apply the same methods at higher ground speeds. With advances in future technology, the speed at which the system transitions to full power could be raised to higher speeds as analytic algorithms and processing speeds improve.

Collision Warning while Blocking:

Blocking traffic on the side of the road or directly in a traffic lane is another dangerous situation for emergency workers.

Figure 12:
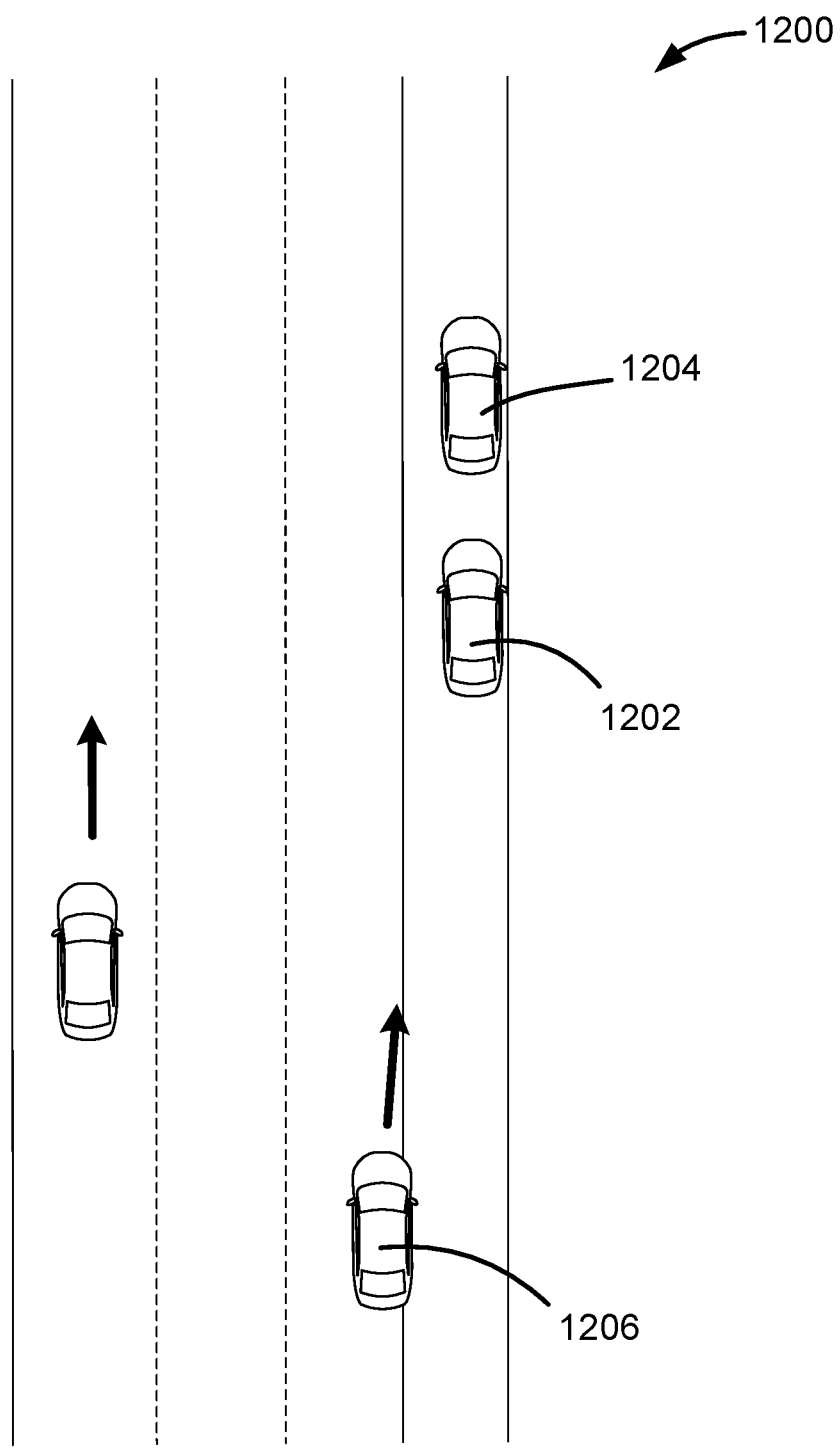
FIG. 12 is another example environment including a street.

In the blocking mode shown in the environment 1200 of FIG. 12, the emergency vehicle 1202 is stopped and blocking traffic for the vehicle 1204. The video analytics system or radar system could continue to monitor surrounding traffic and send a message to the emergency vehicle siren controller or directly to the vehicle's CAN/serial bus to warn the emergency vehicle operator of a pending collision. Again, a warning in the interior of the vehicle 1202 could be "Collision Brace Brace" while flashing the dash cluster or another light in the interior of the emergency vehicle, along with the audible warning through either the vehicle's radio speakers or through a speaker in the siren controller.

For instance, the siren controller can be programmed to detect the weight on the driver's seat to indicate that the emergency vehicle operator is in the emergency vehicle 1202 and that the vehicle 1202 is in blocking mode. The video or radar analytics system detects that a vehicle 1206 is on a vector course (e.g., is in the right lane and drifting) towards the emergency vehicle 1202. The system instructs the siren controller to announce a message inside the emergency vehicle 1202, such as: "Vehicle on collision path. Brace." Other configurations are possible.

Figure 13:
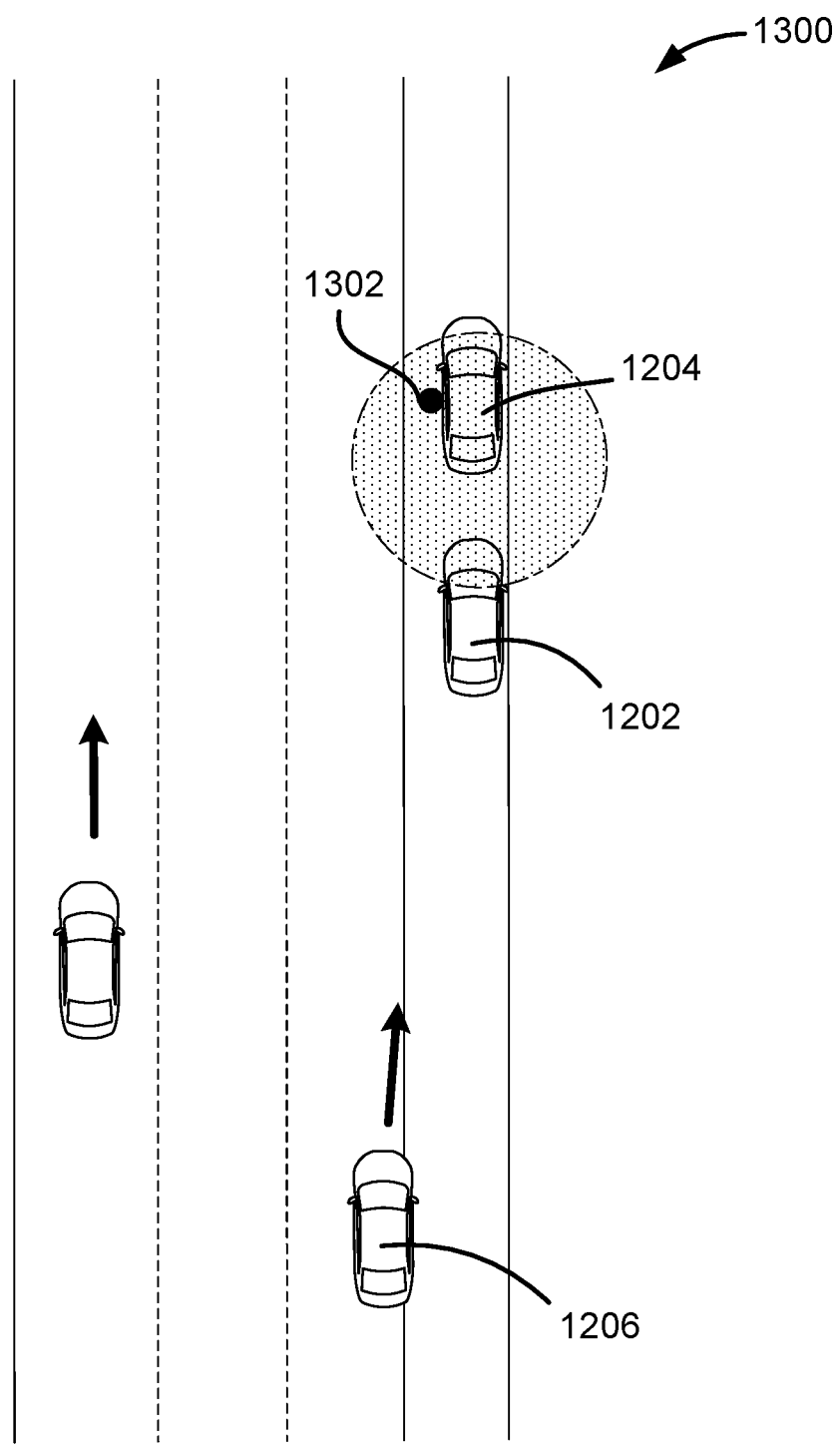
FIG. 13 is another example environment including a street.

In the environment 1300 of FIG. 13, the siren controller system combined with the video analytics processor could also provide collision protection to the emergency vehicle operator 1302 while outside of the vehicle 1202. For a police vehicle, where the police car is stopped and in blocking mode behind another vehicle 1204, say on the shoulder of the road, the siren controller could check the weight of the officer 1302 in the seat and realize that the officer 1302 is not inside the vehicle, the video analytics system could recognize that the officer 1302 is standing near the driver's door of the vehicle 1204 that was pulled over or between the police vehicle 1202 and the stopped vehicle 1204.

The video analytics or radar system could continuously monitor traffic approaching from the rear and warn the officer 1302 through the outside siren speaker/speakers that a vehicle 1206 has not changed lanes and has remained in the lane next to the emergency vehicle to warn the officer that the vehicle 1206 could possibly hit him or collide with the emergency vehicle 1202. The audible warnings of "Vehicle Approaching in Lane" or "Vehicle Collision Path, Take Cover" could be sent out the siren speakers or extra speakers on the emergency vehicle 1202 to warn the officer 1302 of the impending collision at the scene.

Figure 14:
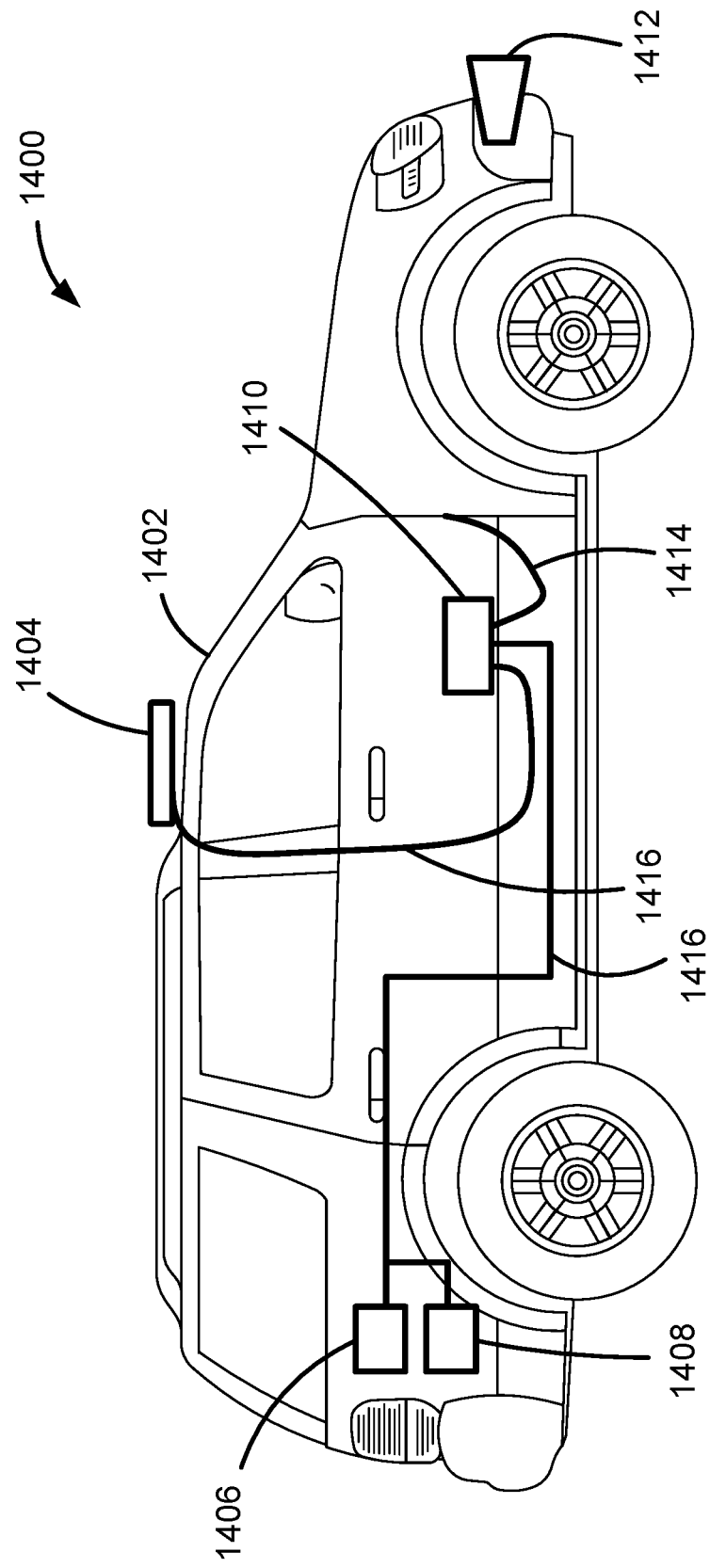
FIG. 14 is an example emergency vehicle.

Refer to FIG. 14 for a typical hardware configuration for the system incorporated into the body 1402 of an emergency vehicle 1400.

The emergency vehicle 1400 includes a fully-integrated light bar such as that disclosed in Sink et al. (U.S. Pat. No. 9,002,313). The light bar can include internal camera(s), radar sensor(s), and/or GPS. In an alternative design, these components can be mounted to different areas of the emergency vehicle 1400.

The emergency vehicle 1400 further includes a video analytics processor 1406 that processes the video or other image data provided by the camera(s) of the emergency vehicle 1400 as described herein. The emergency vehicle 1400 also includes an optional radar analytics processor 1408 that processes the radar data provided by the radar sensor(s).

The emergency vehicle 1400 further includes a siren controller (with optional internal speaker) 1410 to control the siren(s) of the emergency vehicle 1400, as described herein. This can also include optional steerable speakers 1412 or a plurality of speakers mounted to the emergency vehicle 1400 at strategic places.

Further, the emergency vehicle 1400 includes the CAN/serial bus connection 1414 to facilitate communication between the different components of the emergency vehicle 1400. Also included is are serial connections 1416 between the different analytic components. In alternative embodiments, these analytic components (e.g., video analytics processor 1406 and optional radar analytics processor 1408) can be implemented in the same computing device.

In the examples provided herein, the emergency vehicle siren systems include one or more computing devices that control aspects of the systems, such as the lights and siren. A computing device can include a controller having at least one central processing unit ("CPU"), a system memory, and a system bus that couples the system memory to the CPU. The system memory includes a random access memory ("RAM") and a read-only memory ("ROM"). The computing devices can further include a mass storage device. The mass storage device is able to store software instructions and data. One or more of these memories can be used to store one or more oscillating light patterns.

The mass storage device and its associated computer-readable data storage media provide non-volatile, non-transitory storage for the computing devices. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing devices.

According to various embodiments, the emergency vehicle siren systems may operate in a networked environment using logical connections to remote network devices through a network, such as a wireless network, the Internet, or another type of network. The computing devices may also include an input/output controller for receiving and processing input from a number of other devices, including a touch user interface display screen, or another type of input device. Similarly, the input/output controller may provide output to a touch user interface display screen or other type of output device.

As mentioned, the mass storage device and the RAM of the computing devices can store software instructions and data. The software instructions include an operating system suitable for controlling the operation of the computing devices. The mass storage device and/or the RAM also store software instructions, that when executed by the CPU, cause the computing devices to provide the functionality of the controller discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An emergency vehicle siren system, comprising:
   one or more emergency lights;
   a siren; and a controller including a processor and memory, the memory encoding instructions which, when executed by the processor, cause the controller to modify a sound of the siren based upon a context of a vehicle, the context including a speed of the vehicle and a position of a steering wheel of the vehicle.

2. The emergency vehicle siren system of claim 1, further comprising instructions which, when executed by the processor, cause the controller to modify the sound of the siren based upon a collision threat.

3. The emergency vehicle siren system of claim 2, wherein the controller increases a volume of the siren based upon the collision threat.

4. The emergency vehicle siren system of claim 2, wherein the controller decreases a volume of the siren after the collision threat is mitigated.

5. The emergency vehicle siren system of claim 2, further comprising instructions which, when executed by the processor, cause the controller to announce the collision threat.

6. The emergency vehicle siren system of claim 2, further comprising instructions which, when executed by the processor, cause the controller to use video or radar data to quantify the collision threat.

7. The emergency vehicle siren system of claim 2, further comprising instructions which, when executed by the processor, cause the controller to access a profile of the vehicle stored in the memory, the profile defining a type of vehicle.

8. The emergency vehicle siren system of claim 2, further comprising instructions which, when executed by the processor, cause the controller to focus the siren in a particular direction associated with the collision threat.

9. An emergency vehicle, comprising:
one or more emergency lights;
a siren; and
a controller including a processor and memory, the memory encoding instructions which, when executed by the processor, cause the controller to reduce a sound of the siren based upon a context of the emergency vehicle, the context including a speed of the emergency vehicle, and a determination by the controller that it is night at a location of the vehicle, the determination that it is night including a determination that a headlight of the emergency vehicle is activated.

10. The emergency vehicle of claim 9, further comprising instructions which, when executed by the processor, cause the controller to modify the sound of the siren based upon a collision threat.

11. The emergency vehicle of claim 10, wherein the controller increases a volume of the siren based upon the collision threat.

12. The emergency vehicle of claim 10, wherein the controller decreases a volume of the siren after the collision threat is mitigated.

13. The emergency vehicle of claim 10, further comprising instructions which, when executed by the processor, cause the controller to announce the collision threat.

14. The emergency vehicle of claim 10, further comprising instructions which, when executed by the processor, cause the controller to use video or radar data to quantify the collision threat.

15. The emergency vehicle of claim 10, further comprising a camera to capture video data or a radar sensor to capture radar data.

16. The emergency vehicle of claim 15, wherein the camera or radar sensor is integrated into a light bar of the emergency vehicle.

17. The emergency vehicle of claim 10, further comprising instructions which, when executed by the processor, cause the controller to focus the siren in a particular direction associated with the collision threat.

18. A method of providing a siren for an emergency vehicle, the method comprising:
generating a siren sound with the siren; and
automatically modifying the siren sound based upon a context of a vehicle, the context including a speed of the vehicle and a position of a steering wheel of the vehicle.

19. The method of claim 18, further comprising modifying the siren sound based upon a collision threat.

20. The method of claim 19, further comprising increasing a volume of the siren sound based upon the collision threat.

* * * * *